Figure 3:
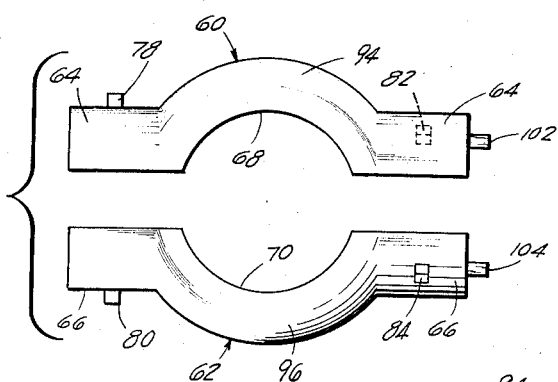

Jan. 3, 1956     W. S. BAER, SR     2,729,421
CAM-LOCKED VALVE
Filed Dec. 16, 1952     2 Sheets—Sheet 1
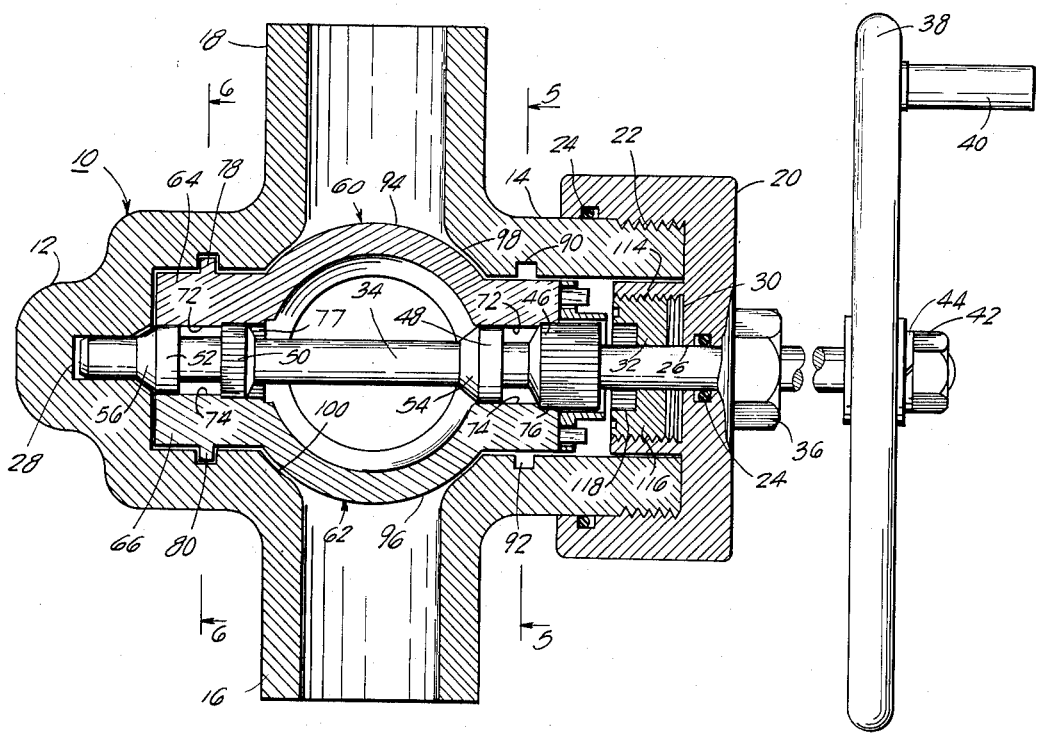
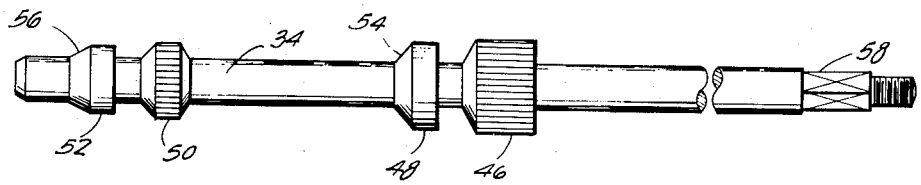
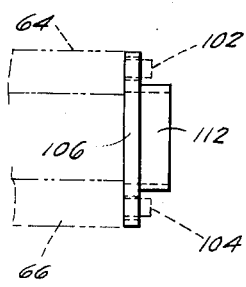
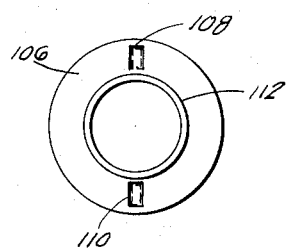
INVENTOR.
WALTER S. BAER, SR.
BY
ATTORNEYS Jan. 3, 1956  W. S. BAER, SR  2,729,421
CAM-LOCKED VALVE Filed Dec. 16, 1952  2 Sheets-Sheet 2

INVENTOR.
WALTER S. BAER SR.
BY
ATTORNEYS

United States Patent Office 2,729,421
Patented Jan. 3, 1956

2,729,421

CAM-LOCKED VALVE

Walter S. Baer, Sr., Yeadon, Pa.

Application December 16, 1952, Serial No. 326,370

1 Claim. (Cl. 251—188)

(Granted under Title 35, U. S. Code (1952), sec. 266)

The invention described herein may be manufactured and used by or for the Government of the United States of America for governmental purposes without the payment of any royalties thereon or therefor.

This invention relates to valves and particularly to an improved valve intended for use in high fluid pressure lines. This application constitutes a continuation-in-part of my co-pending application for United States Patent, Serial No. 291,365, filed June 2, 1952, now abandoned.

In the past considerable difficulty has been encountered in providing a valve for positively shutting off flow of fluids in high pressure lines and particularly pressures of the magnitude of fifteen thousand pounds per square inch or more. Valves developed for such use have been large, complicated and required power means to operate. Moreover, such valves were difficult to disassemble and reassemble for the purpose of inspection, cleaning or replacement of parts.

A valve constructed in accordance with this invention will withstand extremely high pressures yet be comparatively light in weight and form a compact assembly of rugged parts. Such a valve is particularly adaptable for use in aircraft arresting gear mechanism where high fluid pressures are encountered for quickly slowing down aircraft as they are landed. In such mechanism the valve may be used as a by-pass or retracting valve and designed for manual actuation in the event of failure of power means normally employed for actuating the valve. Because of the fewness of its parts and the ability to rapidly disassemble and reassemble the parts through the valve stem opening, the valve lends itself admirably to other situations where rather frequent periodic cleaning of parts is necessary for sanitary or other reasons.

A valve assembly constructed in accordance with this invention may be formed with two aligned but spaced apart circular valve seats and two valve members, one for each seat. The two valve members are mounted in a novel manner so that each is capable of bodily movement in two different directions. Each member is bodily movable from an open position to one side of the fluid flow conduit to a position crosswise of the conduit and adjacent to its respective valve seat and thereafter bodily movable from this last position into engagement with its seat. The two valve members are conjointly operated in a novel manner so that they perform their respective movements in unison. Moreover, the operating means is preferably a single control member entering the space between the valve members and carrying one or more cams which simultaneously engage the two valve members to spread them under very strong forces into engagement with the valve seats.

An important object of the invention is to provide a rugged, positively sealing valve particularly adapted for use in high pressure lines and one which is capable of having the operating parts removed and assembled without detachment of the valve body from the fluid pressure line in which it is installed.

Another important object of the invention is to provide a relatively small, compact, powerfully constructed valve that requires little if any maintenance and which, because of the ability to insert and remove the inner working parts through the valve stem opening, may be welded or otherwise integrally connected into a pipe line without the necessity of flanges, gaskets and bolts.

Another important object of the invention is to provide a rugged durable valve for high pressure use which is designed in a novel manner to utilize the checked fluid as an additional force for sealing the valve against leakage.

Another important object of the invention is to provide a novel arrangement for relieving certain of the valve parts of excessive strain, particularly when operating under extremely high fluid pressures, by utilizing the operating cam elements and the valve members as a sturdy metallic bridge connection between the two valve seats so that the valve applying forces are taken by the latter and not by any of the remaining parts of the assembly.

A further important object of the invention is to provide a valve particularly adeptable for high pressure use and yet one which requires a small actuating force so that it may be controlled with a minimum amount of effort either manually or by power means.

A further object of the invention is to provide an improved valve of the character described hereinabove which is usable without modification in conduits having reversed fluid flow and which is operable to effectively seal the conduit regardless of the direction of the fluid flow.

Figure 5:
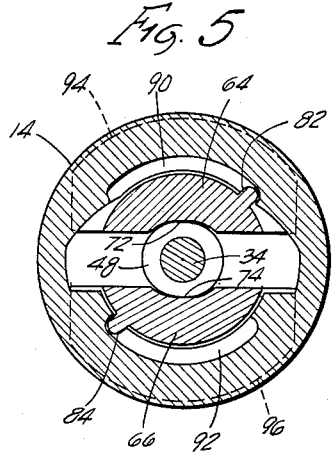
Figure 4:
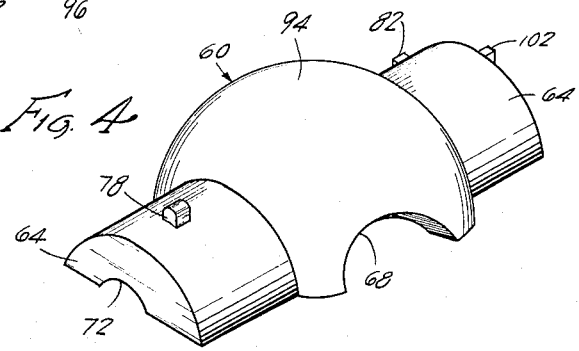
Figure 6:
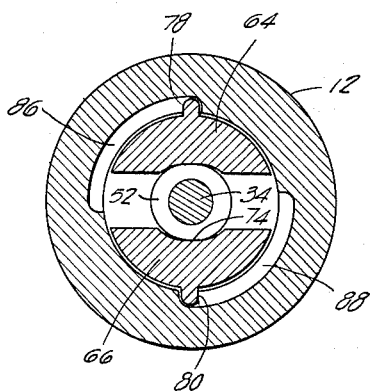
Figure 9:
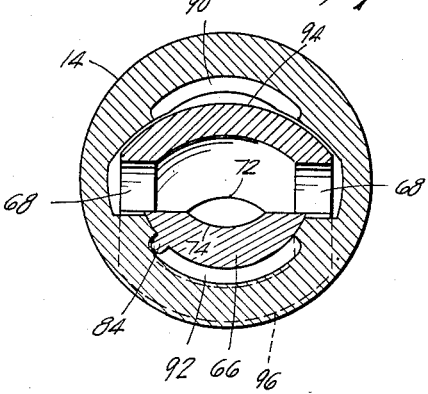

Other objects and many of the attendant advantages of this invention will be readily appreciated as the same becomes better understood by reference to the following detailed description when considered in connection with the accompanying drawings wherein:

Fig. 1 is a longitudinal cross sectional view of a valve assembly constructed in accordance with the invention, Fig. 2 is a side elevation of the valve operating member or shaft, Fig. 3 is a side elevation of the two valve heads or discs showing the position normally assumed thereby in the valve assembly, Fig. 4 is a perspective view of one of the valve heads or discs, Fig. 5 is a cross sectional view of the valve assembly taken along line 5—5 of Fig. 1, Fig. 6 is a cross sectional view of the valve assembly taken along line 6—6 of Fig. 1, Fig. 7 is a side view of a coupling ring for the two valve discs and showing the latter in dotted outline, Fig. 8 is an end view of the coupling ring, and Fig. 9 is a cross sectional view similar to Fig. 5 but showing a position assumed by one of the valve members in the act of assembling or disassembling the valve.

Referring now in detail to the figures in the drawings, wherein one embodiment of the invention is illustrated, there is shown a valve body or housing generally indicated at 10 and including a closed end section 12, an opposite open end section 14, and aligned tubular conduits 16 and 18 for connection into a fluid pressure line. A closure member or gland cap 20 is secured to the open end of section 14 by internal screw threads 22 which mesh with complementary threads on the end section. Suitable internal grooves 24 are provided in the closure member each containing an O-ring packing member. An open ended bore 26 extends through the cap 20 and this bore is in line with a closed end bore 28 in the end section 12 of the housing. The cap may be constructed to define an inwardly opening recess 30 into which is received an element 32 as hereinafter described.

Extending through the valve assembly crosswise to the fluid flow is an operating member or valve stem 34. The stem projects through the bore 26 in the cap member and beyond the outer face of the cap member. To facilitate turning movement by usual size wrenches, the cap member is provided with a relatively small flat sided boss 36 which surrounds the projecting end of the valve stem. The outer extremity of the stem 34 carries a handwheel 38 having a handle 40, the wheel being removably secured to the stem in any suitable manner such as the nut and washer assembly 42—44. The valve stem 34 may project varying distances beyond the valve body, and power means in addition to the handwheel may be coupled to the shaft to actuate the same.

The operating member or valve stem 34 may be made relatively thick as shown for withstanding high pressures. At spaced intervals along its length the valve stem is provided with several operating elements. As best shown in Fig. 2 these operating elements include a gear wheel 46, a cam 48, a second gear wheel 50 and a second cam 52. In assembled position, the first gear and cam 46 and 48 are located in the open end section 14 of the valve housing and the second gear and cam 50 and 52 are positioned in the closed end section 12 of the housing. Although the gears and cams may be separately formed and secured to the valve stem it is preferred where strength is desired to have the gears and cams constitute integral parts of the stem. It is noted that each of the cams 48 and 52 has diametrically opposed high sides and low sides and causing the cam to assume a substantially elliptical formation but preferably such that the high sides are only several thousandths of an inch more than the low sides. It is also desired for reasons pointed out hereinafter to provide conical surfaces on either one or both ends of the cams and gears. The cone surfaces on the two cams 48 and 52 are identified by reference character 54 and 56 respectively. Also, it should be noted that for reasons pointed out hereinafter the cams and gears on the valve stem progressively increase in diameter from left to right as viewed in Fig. 2. Lastly, the valve stem may have the outer end squared as shown at 58 to provide a disconnectible driving connection between the handwheel 38 and the stem.

Positioned on opposite sides of valve stem 34 in the assembled position of the parts are two similarly shaped valve members generally indicated at 60 and 62. Each valve member has a valve seating portion which is illustrated herein as convexly curved and therefore exhibiting a part of a spherical surface. Projecting from the opposite ends of the seating portion are a pair of aligned trunnion-like portions which are similarly shaped to exhibit parts of a cylindrical surface. Referring particularly to Figs. 3 and 4, the trunnion-like portions for the valve member 60 are indicated at 64—64. In Fig. 3 the trunnion-like portions for the other valve member 62 are referred to by reference characters 66—66. The two valve members are assembled in the valve housing in a generally complementary relation to one another but assume the spaced apart relation shown in Fig. 3. The spherical portion of each valve member is less than a hemisphere and the arc transcribed by the trunnion-portions of each valve member is less than 180°.

The remaining two sides of the spherical portion of each valve member is cut away to provide aligned recesses which cooperate with the recesses of the other member to form a fluid passage through the two valve members. The recessed opening for valve member 60 is shown at 68; that for valve member 62 at 70. When the valve members are turned to open position, the recesses 68 and 70 form a fluid passage which aligns with those of the conduits 16 and 18. The side walls of the openings 68 and 70 are preferably formed on a radius of curvature slightly greater than that of the inner walls of the conduits 16 and 18 to compensate for the area occupied by that section of the valve stem extending across the passageway. Thus, free flow of fluid through the valve is assured when it is turned to open position.

The trunnion-like portions 64—64 and 66—66 of the two valve members are provided with complementary arcuate grooves on the under side thereof for receiving the operating shaft 34 and the cams and gears thereon. Such a groove for each of the trunnions 64—64 for valve member 60 is shown at 72; the groove for the trunnions 66—66 of the other valve member 62 is shown at 74. The depths of the grooves in each valve member may vary to accommodate the progressive increase in size of the cams and gears on the valve stem hereinabove mentioned. Internal teeth are formed at 76 in the grooves in the right trunnion portions as viewed in Fig. 1 to mesh with the teeth on the gear 46. In like manner, internal teeth 77 are formed in the grooves 72 and 74 in the left trunnion portions as viewed in Fig. 1 for meshing with the gear 50. As described hereinafter, the two gears 46 and 50 are capable of being retracted from engagement with the internal teeth 76 and 77 respectively.

The trunnion portions 64—64 and 66—66 are mounted in the end sections 12 and 14 so that in the assembled condition of the parts the two valve members may be rotated from an open position to a closed position and return. Suitable means is provided for limiting the rotating movement of the valve members between full open and fully closed position. Such means preferably comprises projections or lugs on the valve members which ride in slots or channels formed in the valve housing. For this purpose, the left end trunnion portions 64 and 66 are provided with similarly shaped lugs 78 and 80 respectively. In a like manner, the right end trunnion portions are provided with similarly shaped lugs 82 and 84 respectively. Lugs 78 and 80 ride in arcuate slots or channels 86 and 88 respectively which are formed on the inner wall surfaces of the end section 12 of the valve housing. Similarly, lugs 82 and 84 ride in arcuate slots or channels 90 and 92 formed in the end section 14 of the valve housing. All the channels occupy a 90° arc of a circle and their ends are closed to form stop abutments to limit the rotation of the valve members to a 90° movement. It is noted in Fig. 3 and by comparison of Figs. 5 and 6 that the channels and lugs in the opposite end sections of the valve housing are displaced 45° to one another. This is to provide a desired clearance in end section 14 to permit the introduction and the removal of the valve parts through the open end thereof as hereinafter described.

The substantially hemispherical portions or heads of the valve members are indicated by reference characters 94 and 96. These valve heads are adapted to engage circular valve seats 98 and 100 respectively formed on the inner ends of the conduits 16 and 18 of the valve housing. In the position shown in Fig. 1 the valve members have been turned to obstruct the passage through the valve housing but have not been spread or expanded relative to one another into engagement with their respective valve seats. This action will take place when the cams and the shaft 34 are rotated relative to the valve members as described hereinafer. It is preferred, especially for high pressure usage, to coat the valve seats with surface hardening material, such as cobalt.

To hold the valve members 60 and 62 in diametrically opposed relation in whatever position they are turned, and particularly when the gears 46 and 50 are retracted out of engagement with the teeth 76 and 77, it is preferred to provide a connection between the valve members which holds them against relative rotational movement but permits radial movement relative to one another. For this purpose, the trunnion portions 64 and 66 which occupy the end section 14 of the housing are each provided with an axially projecting pin identified by reference characters 102 and 104 respectively. Interengaging with these pins and connecting the valve members together is a flat annularly shaped member or ring 106. The ring is provided with a pair of openings 108 and 110 located on opposite sides of the ring's center and receiving the pins 102 and 104 respectively as shown in dotted outline in Figs. 7 and 8. Preferably the pins and openings are rectangularly shaped as shown but with the openings of greater radial extent than the pins in order that the valve members may be moved or spread away from one another into engagement with their respective valve seats. The ring 106 is provided with a circular flange or collar 112 which projects toward the open end of the housing section 14 and beyond the gear 46 when in engaged position to serve as a stop limiting the inward position of the element 32.

The cap member 20 is provided with an inwardly projecting circular flange 114 which is co-axial with the valve stem and cooperates with the base of the cap member to provide the recess 30 previously mentioned. The flange 114 is co-axial with the valve stem and is internally threaded. Received in the recess 30 is the element 32 previously referred to. The element is arranged to receive the gear 46 and releasably lock the same and the valve stem against rotation. For this purpose the outer portion 116 is extending inwardly beyond that of the inner portion to form a recess 118. The recess is of a size to slidably fit the gear 46 and is cut with internal teeth adapted to mesh with the teeth on the gear. The element 32 is resistingly rotatable in the flange 114 of the cap member. The two parts are respectively provided with external and internal helical threads for this purpose. Spanner wrench recesses may be provided in the exposed end of the element 32 for threadedly adjusting the same within the cap member. Preferably the element is so positioned with respect to the gear 46 that when the latter is moved outwardly from the position shown in Fig. 1 it first meshes with the teeth in the recess 118 of the element before disengaging from the teeth 76 of the valve members.

The position assumed by the valve parts in Fig. 1 is that just prior to the seating of the valve members 60 and 62 on the valve seats 98 and 100. The valve members have been rotated to a position where the hemispherical heads lie across the fluid passage in juxtaposition to the valve seats but not pressed thereagainst. Rotation of the valve members to this position was accomplished by turning the hand wheel 38 or otherwise rotating the valve stem, which rotational force was carried by the gears 46 and 50 to the valve members. In this position the low sides of the cams 48 and 52 are disposed in the grooves 72 and 74 as shown in Figs. 5 and 6.

When the valve stem 34 is pulled out by the handwheel or otherwise shifted outwardly from the position shown in Fig. 1 the gears 46 and 50 are retracted out of engagement with the valve members thereby breaking the rotative connection between the valve members and the operating shaft or stem. However, the cam elements 48 and 52 are still retained in their respective portions of the arcuate grooves 72 and 74. Before the gear 46 is completely retracted from engagement with the teeth 76 of the valve members it enters the recess 118 of element 32 and its teeth mesh with the internal teeth of the latter.

When the gears 46 and 50 are completely disconnected from the valve members any further rotation of the valve stem will have no rotational effect on the members. If the valve stem is now turned by the handwheel or otherwise rotated, the gradually curved cams will commence to bring their high sides into engagement with the walls of the grooves 72 and 74. Continued rotation of the cams will spread the valve members apart and press them against their respective valve seats. For maximum sealing results the high sides of the cams should be rotated to the position where their long axes extend in the same direction as the common axis of the two conduits 16 and 18. In this position very little if any turning moment can be imposed by fluid pressure on the cams tending to rotate them toward their released position.

However, to assure holding the cams in operating position, it is preferred to employ some means for resisting return movement of the cams such as the element 32. Through its threaded connection to the cap member the element effectively resists relatively small turning forces applied through the valve members against the cams but will yield to larger turning forces applied to the handwheel either manually or by power means. Thus, when the valve shaft 34 is pulled out to provide the desired wedging action by the cams, the gear 46 meshes with the teeth on the element 32 and the latter through its threaded connection with the cap member resistingly holds the cams and the valve shaft in adjusted position except when external forces are applied to the handwheel or equivalent operating means.

When it is desired to open the valve, the valve stem is turned by the handwheel or other means in the direction to release the cams and to the position shown in Figs. 5 and 6 where the low sides of the cams are received in the grooves 72 and 74. This will release the valve members 60 and 62 from pressing engagement with their respective valve seats and they are permitted to contract slightly toward the valve stem. Thereafter, the valve stem is axially shifted inwardly carrying gear 46 out of engagement with the teeth of element 32 and both gears 46 and 50 into engagement with the teeth 76 and 77 of the valve members. Turning movement of the valve stem will rotate the valve members to partly or fully open position. The valve members may be releasably locked in any partly open condition by pulling out the valve stem and rotating the stem to react the high sides of the cams against the valve members and press them in their partly open condition against the valve seats.

When pressed against the valve seats by the cams in either partly of fully closed condition, the valve members together with the cams form a metallic bridging connection from one valve seat to the other which transmits the fluid pressure onto one or the other of the valve seats depending on the direction of fluid flow. In this manner, the fluid pressures are not taken by the valve stem and associated supports therefor but by sturdy cams and valve members which in turn transmit the pressure loads to the valve housing. Moreover, under excessively high pressures, it is evident that if the fluid pressure lifts one of the valve members off of its seat, the direction of the pressure is such that it will press the other valve member with greater force against its seat. Whatever fluid does leak into the space between the valve members will be taken care of by the packing rings 24 or any other sealing means that may be employed. It is also evident that the valve is capable of functioning with equal degree of sealing ability whether the fluid pressure acts in one direction or the opposite direction. The valve is thus well adapted for usage in lines where reversals of fluid flow occur.

Another important feature of the invention is the arrangement whereby all of the valve operating parts may be introduced, assembled, and removed through the valve stem opening of the housing. Moreover, by virtue of the fewness of the parts and their mounting relation to one another, the assembly and disassembly operation can be performed easily and quickly thereby rendering the valve particularly suitable for usage where frequent or periodic inspection or cleaning of parts is necessary.

To assemble the parts in the valve the two valve members are first introduced through the open end of housing section 14 before any other parts are inserted. However, only one valve member is introduced at a time. Assuming the valve structure is arranged in the upright position shown in Fig. 1, it is preferred to insert the lower of the two valve members first but in inverted relation to the position shown in Fig. 1. Thus, the valve member 62 is slid through the end section 14 but in upside down condition. After its head 96 straddles the fluid passage, the valve member 62 is rotated to the position shown in Fig. 1 while at the same time bringing the lugs 80 and 84 into the channels 88 and 92.

The second valve member 60 is inserted through the end section while assuming the position shown in Fig.

1. It is slid over its companion valve member with the bottom and top surfaces of the members in contact with one another in the manner shown in Fig. 9. In this figure, the widest part of the hemispherical head 94 of valve member 60 is shown on the section line 5—5 of Fig. 1. To permit passage of the hemispherical heads of the valve members through end section 14, it is widened laterally as shown in Figs. 5 and 9. This widened condition necessitates locating the channels 90 and 92 in the position shown in Figs. 5 and 9 rather than that shown in Fig. 6, otherwise the channels 90 and 92 would open into the widened area. It is thus apparent that the two valve members, which in assembled position will occupy a cross sectional area approximately twice that of the opening of the housing section 14, can be inserted through this opening and assume a superimposed position crosswise to the fluid passage.

The ring member 106 is next assembled. Preferably a tapered rod of wood or soft metal is temporarily introduced between the two valve members to spread them apart to their normal radial spaced relation in the housing. The ring 106 is slipped over the tapered rod and fitted onto the pins 102 and 104 of the valve members. Upon removal of the rod the valve members will be supported in spaced apart relation by the ring.

The cap member 20 may be mounted on the valve shaft or stem either before or after the cam and gear end of the stem is introduced between the valve members. The handwheel is removed to permit the cap member and its associated element 32 to be mounted on the valve stem. The cam and gear end of the valve stem is inserted into the opening of the housing section 14 and between the valve members. The stem slides in the grooves 72 and 74 of the valve members, the conical surfaces such as shown at 54 and 56 aiding in further spreading the valve members apart, if this is necessary, as the stem advances. When the stem is fully inserted, the cap member is threaded onto the end section 14 and tightened in place. Before the cap is threaded to the housing, the element 32 may be adjusted to assure meshing with gear 46 before the gear disengages teeth 76 of the valve members. The valve is now ready for operation in the manner previously described.

It is evident that when it is desired to disassemble the steps of assembly are reversed. During both the assembly and disassembly operations the progressive increase in diameter of the cams and gears toward the outer end of the valve stem aids in inserting the stem into the valve members and removing the same therefrom.

Suitable means may be provided for indicating the full on and off valve positions and any intermediate degree of valve opening and for indicating whether the valve stem is in position to rotate the valve members or to cam them against the valve seats. Match markings, which may be applied when the parts are assembled, may be placed on the cap member 20 or boss 36 and on the shaft 34 to indicate the turned and axial positions of the shaft. The shaft marking may cooperate with the boss to indicate whether the shaft is shifted "in" for rotating the valve members or shifted "out" for expanding the valve members radially into engagement with their respective seats. Markings circularly arranged on the boss may serve to indicate the rotatable position of the valve members when the shaft is "in" or to indicate the radial position of the valve members when the shaft is "out." It is obvious that various different types of indicating means may be used for this purpose, including an electrical system for indicating at a remote point the condition of the valve.

Obviously many modifications and variations of the present invention are possible in the light of the above teachings. It is therefore to be understood that within the scope of the appended claim the invention may be practised otherwise than as specifically described.

What is claimed is:

A valve mechanism comprising a valve housing having inlet and outlet passages and a valve chamber communicating with the said passages; valve seats surrounding the said passages; a plurality of valve elements; means for removably securing the valve elements one to another so that they move in the chamber as a unit to and from an open, a preliminarily closed, and a closed position with respect to the passages; a valve stem; means mounting the valve stem in the chamber for rotary and axis movement; spline means on the valve stem for rotating the unit between its open and its preliminarily closed positions when the valve stem occupies a first preselected axial position; and cam means on the valve stem for operating the unit between its preliminarily closed and its closed positions when the valve stem occupies a second preselected axial position; and means including an internally splined member which is positioned on the housing and which is adapted to engage the spline means on the valve stem for resisting rotary movement of the unit when the valve stem occupies its second axial position.

References Cited in the file of this patent

UNITED STATES PATENTS

| 671,443   | Jennings   | Apr. 9, 1901   |
| 1,639,743 | Marscheider | Aug. 23, 1927 |
| 1,705,487 | Marscheider | Mar. 19, 1929 |
| 2,072,965 | Robinson   | Mar. 9, 1937   |
| 2,086,001 | Shaw       | July 6, 1937   |
| 2,277,975 | Heggen     | Mar. 31, 1942  |
| 2,501,635 | Schmidt    | Mar. 21, 1950  |
| 2,612,340 | Laurent    | Sept. 30, 1952 |

FOREIGN PATENTS

| 337,913 | Germany | June 9, 1921   |
| 540,231 | Germany | Dec. 9, 1931   |
| 602,611 | Germany | Sept. 12, 1934 |
| 679,949 | Germany | Aug. 18, 1939  |
| 853,391 | France  | Mar. 18, 1940  |